United States Patent [19]

Yuh et al.

[11] Patent Number: 4,846,516
[45] Date of Patent: Jul. 11, 1989

[54] AUTOMATIC HOLDER FOR KEY CAPS

[75] Inventors: Marcus Yuh; Shi-Ming Lin, both of Chutung Hsinchu, Taiwan

[73] Assignee: Industrial Technology Research Institute, Taiwan

[21] Appl. No.: 105,910

[22] Filed: Oct. 8, 1987

[51] Int. Cl.⁴ .......................... B25J 15/06; B66C 1/02
[52] U.S. Cl. ........................................ 294/64.1; 279/3
[58] Field of Search ................. 294/64.1, 65; 414/737, 414/744 B, 752; 271/90, 106, 92; 279/3, 5; 901/40

[56] References Cited

U.S. PATENT DOCUMENTS

| 2,766,879 | 10/1956 | Draper | 209/512 |
| 3,465,495 | 9/1969 | Zwiacher et al. | 294/64.1 |
| 4,007,942 | 2/1977 | Hoflinger | 279/3 |

OTHER PUBLICATIONS

IBM Technical Disclosure Bulletin vol. 23, No. 10, Mar. 1981, pp. 4784–4785.

Primary Examiner—James B. Marbert
Attorney, Agent, or Firm—Cahill, Sutton & Thomas

[57] ABSTRACT

A cup shaped holder for transporting and installing a key cap on a key switch in a keyboard. The holder has an open end and resilient side walls for closely receiving the upper portion of a key cap. The closed end of the holder is at an angle to the direction of movement of the holder and is adapted to engage the upper surface of the key cap to more nearly align the cap with the key switch when the cap is pressed on the switch by the holder.

4 Claims, 1 Drawing Sheet

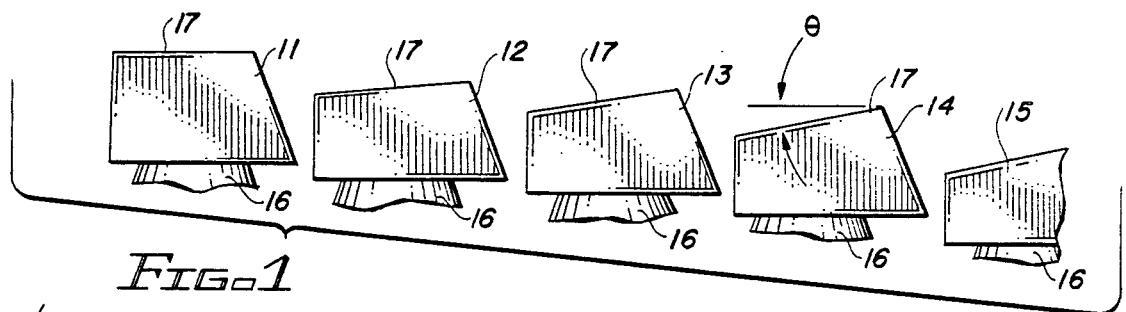
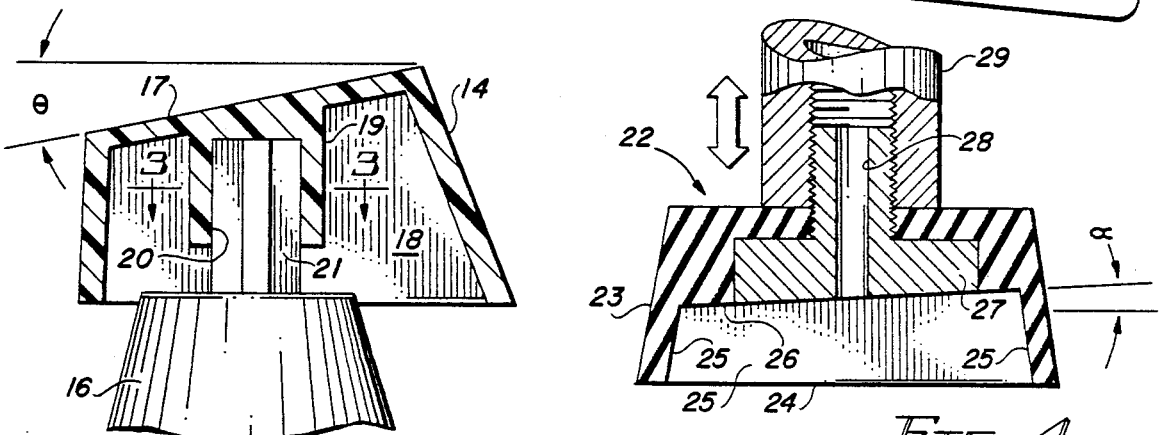
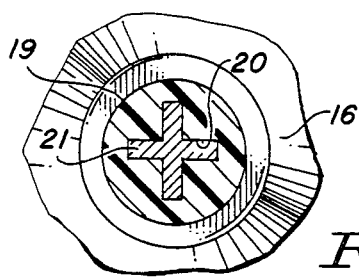
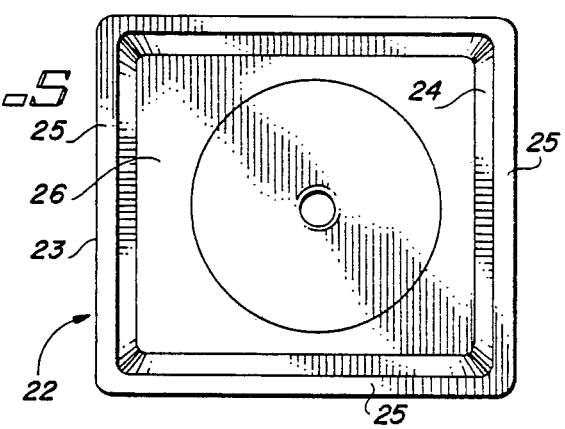
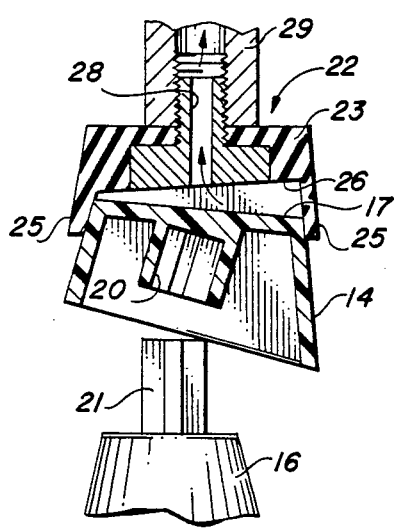
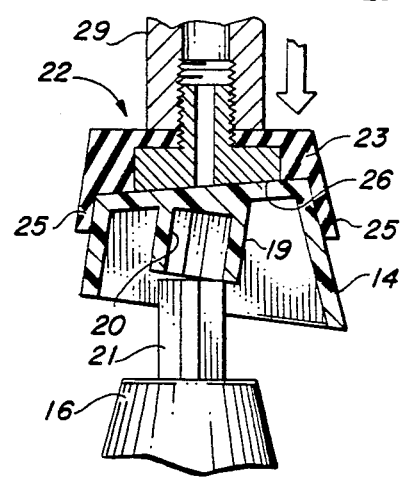

AUTOMATIC HOLDER FOR KEY CAPS

TECHNICAL FIELD

This invention is concerned with automated installation of key caps on key switches in electric keyboards, such as those used with computers and word processors.

BACKGROUND ART

Most computer and word processor manufacturers utilize standardized keys in their keyboards. One of the most popular standards is that identified as "DIN specifications". DIN is an acronym for Deutsche Industrie Normen, or German Industry Standard.

DIN keys all generally have the same size bases and the same size top surfaces, but the keys vary as to their sculpture depending upon their intended location on the keyboard. In particular, the angle of the top surface with respect to the base varies considerably for key caps in different rows of the keyboard. This variety of sculptures for the key caps presents special problems when one seeks to automate the installation of the key caps on their respective switches.

It has long been recognized that automated movable holders can be utilized to pick up small objects, transport them to an installation site and install the objects on or into associated components. And the use of flexible suction cups to hold and lift the objects is quite common. See for example, the automated egg handling apparatus disclosed in U.S. Pat. No. 2,766,879 granted Oct. 16, 1956, to R. E. Draper for "Egg Handling Apparatus". U.S. Pat. No. 4,007,942 granted Feb. 15, 1977, to H. Hoflinger for "Device For the Uptake of Cup-Shaped Parts of Gelatin Capsules" discloses an automated capsule handling device which employs holders which have vacuum cavities shaped to receive the capsules.

So, the obvious solution to the handling of DIN specification key caps would be to utilize a holder which is specifically shaped to receive each style of cap. Unfortunately, that greatly adds to the cost of the equipment needed to automate the assembly of the key caps because the holder for the caps in one row differs from the holder for caps in the other rows of the keyboard.

DISCLOSURE OF THE INVENTION

According to this invention, a holder is provided which is capable of grasping, transporting and installing a variety of styles of DIN specification key caps. The holder is of cup-shaped configuration and has resilient side walls sized to closely confine the upper portion of the various key caps. Because all of the caps have virtually the same size upper surface it is relatively easy to select a shape and size for the open end of the holder to closely fit over the upper regions of the caps. The flexibility of the resilient side walls of the holder accommodate the slight variations in sculpture of the upper regions of the caps. Coupled with this flexible wall structure, however, is a feature which assures that the caps will have only a minimal misalignment with the key switch as the cap is brought into engagement with the switch.

This feature is a sloping end wall spaced from the open end of the holder and adapted to come into face to face contact with the sloping upper surface of the key cap. The angle of this end wall in relation to the path, or line, of movement of the holder has been determined to be approximately 2.6° from a plane perpendicular to the path of movement of the holder. Although the holder may be called upon to pick up and install different styles of key caps having different structures, when the upper surface of the key cap is forced against the end wall of the holder the cap will be sufficiently aligned with the switch to insure proper installation. The sloping end wall of the holder does not assure perfect alignment of the key cap with its switch, but has the effect of limiting the misalignment of the key cap to a degree that can be tolerated when the key cap is forced onto the switch.

BRIEF DESCRIPTION OF THE DRAWING

The invention is described in greater detail hereinafter by reference to the accompanying drawing wherein:

FIG. 1 is a diagrammatic illustration in side elevation of several key caps located in different rows on a keyboard;

FIG. 2 is an enlarged vertical sectional view through one of the key caps of FIG. 1 illustrating the manner in which the cap is attached to a switch;

FIG. 3 is a horizontal sectional view taken as indicated by line 3—3 in FIG. 2;

FIG. 4 is a vertical sectional view through a cap holder constructed in accordance with this invention;

FIG. 5 is a view of the underside, or open end, of the holder of FIG. 4;

FIG. 6 is a vertical sectional view illustrating how the holder carries a cap prior to installation; and FIG. 7 is a vertical sectional view illustrating the relationship between the cap and the holder as the cap is applied to the switch.

BEST MODE FOR CARRYING OUT THE INVENTION

Referring to FIG. 1, the numerals 11 through 14 designate four key caps each arranged in a different row on an electric keyboard the remainder of which is not shown. A shift bar which is normally associated with a keyboard is indicated at 15. Each of the key caps 11 through 14 and the shift bar 15 are mounted on and are intended to actuate switches 16.

Key caps 11 through 14 when manufactured in accordance with DIN specifications will all have approximately the same size base and approximately the same size upper, or striking surface 17. Under one type DIN specification the base of each key cap measures approximately 18.24 mm.×18.24 mm. and the upper surface of each cap measures approximately 12.06 mm.×14.06 mm. As can be appreciated from FIG. 1, however, the key caps 11 through 14 have different sculptures. By that is meant that their side walls vary in their angles with respect to the horizontal and, particularly, the angle $\theta$ between the upper, or striking, surface 17 of the caps and the base is markedly different from cap to cap. This angle may vary anywhere between 0° and 12°.

FIGS. 2 and 3 illustrate the construction of the typical key cap 14 and its manner of attachment to its switch 16. The cap 14 is preferably injection molded from a temperature resistant plastic material and generally has a hollow interior 18 to conserve material. Molded in the interior 18 of cap 14 is a boss 19 having a cruciform cavity 20 therein shaped to receive a cruciform post 21 projecting upwardly from switch 16.

In order to reduce the cost of the keyboards, it is desirable to automate the process of installing key caps 11 through 14 on their respective switches 16. Prior automated operations have utilized vacuum sucker elements to grasp, transport and assemble components such as the key caps 11 through 14.

Often, such sucker elements operate on the upper surface of the object being lifted and transported. It can be appreciated from the assembly illustrated in FIG. 3 that this is not a particularly desirable mode of transporting and assembling key caps 11 through 14. For one thing, in high speed manufacturing facturing operations producing low cost keyboards the indicia appearing on the upper surface 17 of each key cap may appear in ink that has not yet been allowed to dry and which would be damaged or obliterated by any object coming in moving contact with that surface.

A more serious problem is posed, however, by the fact that the upper surface 17 of a key cap such as cap 14 is at other than a 90 degree angle to the axis of the post 21 on switch 16. Were the cap 14 to be picked up by a flat sucker element acting on the upper surface 17 of the cap, the cavity 20 in boss 19 would most assuredly be misaligned from the post 21 making assembly of the cap on the switch difficult or impossible. It is the solution of these problems that concerns the subject invention.

In accordance with this invention the key caps 11 through 14 are gripped, lifted, transported and assembled to their respective switches 16 by means of a holder, or jaw, indicated generally by reference numeral 22 and illustrated in FIGS. 4 and 5. Holder 22 has a cup-like body 23 made of silicone rubber or other resiliently flexible material. The lower end 24 of the cup-like body 23 is open and a cavity inside the holder is surrounded by flexible walls 25. Walls 25 taper slightly inwardly as they extend upwardly to a generally panar end wall 26 closing the cavity in the holder 22.

Holder 22 further includes a metal insert 27 having a passage 28 therein through which air can be evacuated from the space between body walls 25 to create a partial vacuum therein. The upper end of insert 27 is threadably received in a pipe 29 which serves to convey air away from holder 22 and also provides a means for manipulating the holder by moving it up and down as indicated by the arrows in FIG. 4.

It is an important feature of the holder 22 that planar end wall 26 therein is disposed at an angle with respect to a plane at right angles to the path or direction that the holder 22 is moving when the holder is affixing or attaching a cap to its switch 16. This angle, designated α in FIG. 4, is approximately 2.6°. Stated differently, the sloping end wall 26 can be viewed as being disposed at an angle of approximately 87.4° with respect to the direction of movement of a holder 22 as indicated by the arrows in FIG. 4.

Operation of the holder 22 in transporting a key cap 14 and assembling it onto a switch 16 is illustrated in FIGS. 6 and 7. FIG. 6 illustrates a typical attitude which can be assumed by a key cap 14 when being held and transported by holder 22. It will be noted that the key cap 14 is canted within holder 22 with the upper region of the cap being closely confined and held by the flexible walls 25 of the holder. The gripping action of the holder on the cap 14 is assisted by creating a partial vacuum within the holder 22 by withdrawing air through passage 28 therein as indicated by the arrows in FIG. 6.

It will be noted that with the key cap 14 held in the attitude shown in FIG. 6 the cavity 20 therein is substantially misaligned with the post 21 to which it is to be assembled. Misalignment of that degree normally would severely interfere with, if not prevent, installation of key cap 14 onto its switch 16 because the misalignment would prevent entry of post 21 into cavity 20. However, this condition is altered by the presence of sloping end wall 26 in holder 22 and the flexibility of the side walls 25 of the holder.

FIG. 7 illustrates the realignment of key cap 14 which takes place as the key cap comes in contact with post 21 on switch 16 and assembly pressure is applied to holder 22 forcing the holder and cap 14 toward switch 16. The direction of this pressure, or force, is indicated by the arrow in FIG. 7 and can be fairly substantial, of the order of 6 kg/cm$^2$. As the cavity 20 in key cap 14 approaches the post 21 the resulting resistance to further movement of cap 14 causes the cap to be forced upwardly within the cavity in holder 22. This movement is facilitated by the flexibility of side walls 25 of the holder 22. Eventually, the upper surface 17 of cap 14 will contact the sloping inner wall 26 of holder 22 and stop further relative movement between the cap 14 and the holder 22. The movement which has taken place, however, is sufficient to realign partially the cavity 20 in cap 14 with post 21 on switch 16. Although some slight misalignment may continue, this is not sufficient to prevent entry of post 21 into cavity 20 for the initial assemblage of cap 14 onto switch 16. As this assembly continues and post 21 enters cavity 20 to a greater depth further alignment between the two is permitted by the flexibility of the walls 25 gripping the upper region of cap 14. If desired, and if a partial vacuum is employed inside the holder 22, the vacuum can be relieved at this point to facilitate relative movement of the cap 14 inside holder 22 as the cap 14 is forced down over post 21 to completely seat the cap on the post. The holder 22 is then lifted and disengaged from cap 14 to be used for a subsequent assembly operation with a different cap.

From the foregoing it should be apparent that the holder 22 is capable of lifting, transporting and assembling various styles of DIN specification key caps such as those illustrated by the range of caps shown as 11 through 14 in FIG. 1. The sequence illustrated in FIGS. 6 and 7 is an extreme one because of the size of the angle on the top surface 17 of cap 14. More corrective alignment can be imparted to key caps 11 through 13 because the angles assumed by their upper surfaces 17 are less than that of key cap 14. Consequently, the holder 22 is capable of imparting a closer alignment of the cavities 20 in key caps 11 through 13 with their respective switch posts 21.

What is claimed is:

1. Apparatus for transporting and installing a key cap on a key switch, comprising a holder movable along a generally vertical path toward and away from said key switch, said holder having an open lower end and resilient side walls shaped to closely confine an upper region of the key cap, said holder further having a generally planar upper end spaced from its open end, said planar upper end being disposed at an angle of about 2.6° to the horizontal, the side walls of said holder being sufficiently flexible to permit the top surface of a key cap to come in contact with said end wall when the key cap is pressed onto said key switch.

2. The apparatus of claim 1 wherein said holder has a partial vacuum therein to assist in holding the key cap in said holder.

3. Apparatus for transporting and installing a key cap comprising a cup shaped holder having walls made of elastomeric material, said holder being movable along a path toward a key switch to which said cap is to be installed, said holder having its open end disposed toward said key switch with the walls thereof sloping inwardly and away from the key switch, the walls of said holder being shaped to closely confine the upper portion of a key cap, said holder being further characterized in having a generally planar end spaced from its open end, said planar being disposed at an angle of about 87.4° from the path of movement of the holder, the walls of said holder being sufficiently flexible to permit the top surface of a key cap to come in contact with said planar end when the key cap is pressed onto said key switch by said holder.

4. The apparatus of claim 3 wherein said holder has a partial vacuum therein to assist in holding said key cap in said holder.

* * * * *